UNITED STATES PATENT OFFICE.

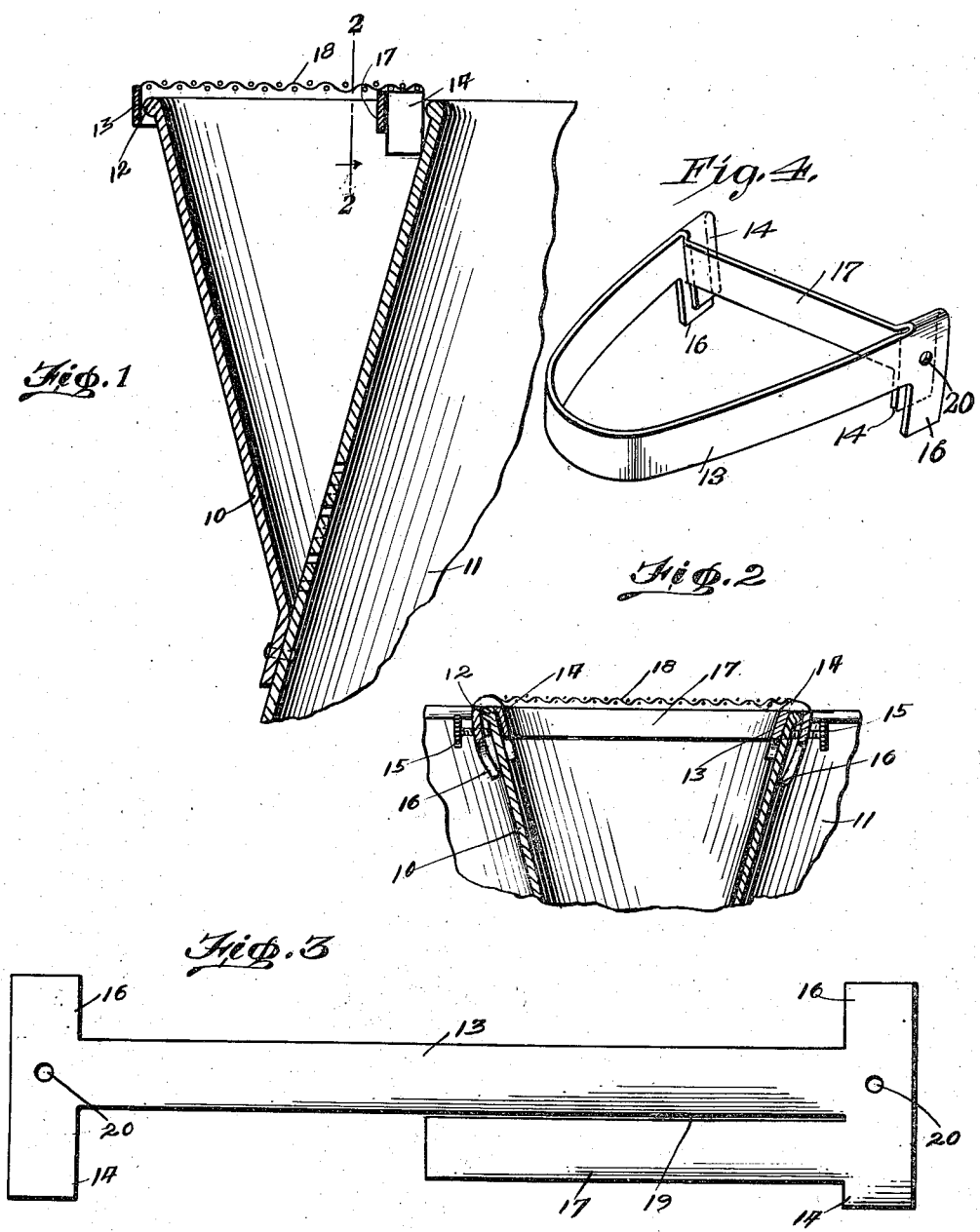

WARREN R. DURGIN, OF BROWNVILLE, MAINE.

COFFEE-STRAINER.

1,306,050.

Specification of Letters Patent. Patented June 10, 1919.

Application filed October 31, 1918. Serial No. 260,504.

*To all whom it may concern:*

Be it known that I, WARREN R. DURGIN, a citizen of the United States, residing at Brownville, in the county of Piscataquis, State of Maine, have invented certain new and useful Improvements in Coffee-Strainers; and I do hereby declare the following to be a full, clear, and exact description of the invention, such as will enable others skilled in the art to which it appertains to make and use the same.

This invention relates to new and useful improvements in attachments for coffee pots.

One object of the present invention is to provide a novel and improved strainer which is readily adapted to be detachably secured to the mouth of the pouring spout of a coffee pot.

Another object is to provide a novel and simple device of this character wherein the main or frame portion of the device is adapted to be formed from a single blank of metal.

Other objects and advantages will be apparent from the following description when taken in connection with the accompanying drawing.

In the drawing:

Figure 1 is a vertical sectional view through a portion of a coffee pot showing my invention applied thereto.

Fig. 2 is a fragmentary vertical transverse sectional view taken on the line 2—2 of Fig. 1.

Fig. 3 is a plan view of the blank from which the frame of the strainer is formed.

Fig. 4 is a perspective view of the frame of the strainer removed from the spout to clearly show the manner of folding the blank.

Referring particularly to the accompanying drawing 10 represents the pouring spout of the coffee pot 11, which has the rolled rim 12. Engaged outwardly of the rim 12 is a flat metal strip 13 which is bent to conform to the curvature of the mouth of the spout. On the ends of the strip 13 there are formed the depending tabs 16 which engage with the outer face of the spout, adjacent the body of the coffee pot. Above the tabs, the ends of the strip are formed with threaded openings 20 for the reception of the clamping screws 15, which screws engage with the outer face of the sides of the spout. Formed integrally with the upper edges of the ends of the strip, and bent to extend downwardly and to engage inwardly of the spout, are the tabs 14, said tabs being connected by the transverse strip 17, which extends across the interior of the spout, adjacent the body of the pot for the purpose of strengthening the strip 13, at these points and to hold the strip in its properly bent U-shaped formation. Secured to the upper edge of the strip 13, and extending across the mouth of the spout, is a wire screen or strainer 18, which prevents the escape of the coffee grounds from the spout when the coffee is being poured. The frame of the device, being formed from a blank, it will readily be understood that one end of the bracing strip 17 is integrally connected to one of the tabs 14, while the other end is connected to the other tab by means of rivets, or solder, as may be more convenient or found to be cheapest in the manufacture of the device. Secured to and extending over the upper edge of the strip 13 is a wire screen 18 through which the coffee flows when the pot is tilted, and which stops the grounds, and prevents escape thereof into the cup, into which the coffee is being poured.

Referring particularly to Fig. 3 of the drawing it will be seen that the blank includes the narrow strip 13, having the laterally directed tabs 14 and 16 at both of its ends. Formed integrally on the inner edge of one of the tabs 14, and extending in longitudinal parallel relation to the strip 13, is the strip 17, the latter being shorter than the former and separated therefrom by the longitudinal line of cut 19. In each of the portions 14 there is formed a threaded opening 20 for the reception of a screw 15, before-mentioned.

The wire screen may be riveted onto the strip 13, or may be soldered thereto, as desired by the manufacturer.

There is thus provided a novel, cheap, and simple, as well as effective device for preventing the escape of grounds from the coffee pot while pouring.

What is claimed is:

A coffee strainer including a flat strip bent to fit horizontally around and outwardly of the mouth of the pouring spout of a coffee pot, a straining screen secured to and covering the strip for extension across the mouth of the spout, clamps on the ends of the strips for detachable and embracing engagement with the edge portion of the mouth of the spout, and a connecting member extending between the clamps within the spout and adjacent the body of the coffee pot.

In testimony whereof, I affix my signature, in the presence of two witnesses.

WARREN R. DURGIN.

Witnesses:
 HIRAM GERRISH,
 C. E. HENICK.